US 9,398,396 B2

(12) United States Patent
Grokop et al.

(10) Patent No.: US 9,398,396 B2
(45) Date of Patent: Jul. 19, 2016

(54) METHOD AND APPARATUS FOR CHARACTERIZING CONTEXT OF A MOBILE DEVICE

(75) Inventors: Leonard Henry Grokop, San Diego, CA (US); Anthony Sarah, San Diego, CA (US); Vidya Narayanan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 753 days.

(21) Appl. No.: 13/269,178

(22) Filed: Oct. 7, 2011

(65) Prior Publication Data

US 2012/0182420 A1 Jul. 19, 2012

Related U.S. Application Data (60) Provisional application No. 61/433,865, filed on Jan. 18, 2011.

(51) Int. Cl.
 *H04N 7/18* (2006.01)
 *H04W 4/00* (2009.01)
(52) U.S. Cl.
 CPC ..................................... *H04W 4/001* (2013.01)
(58) Field of Classification Search
 None
 See application file for complete search history.

(56) References Cited

U.S. PATENT DOCUMENTS

| 6,493,095 | B1 * | 12/2002 | Song et al. .................... 356/603 |
| 7,268,799 | B2 | 9/2007 | Patino et al. |
| 7,643,069 | B2 | 1/2010 | Jun |
| 2002/0135468 | A1 * | 9/2002 | Bos et al. ....................... 340/436 |
| 2003/0048956 | A1 * | 3/2003 | Mitchell et al. ................ 382/250 |
| 2003/0197597 | A1 * | 10/2003 | Bahl et al. ..................... 340/7.58 |
| 2005/0088567 | A1 | 4/2005 | Kim |
| 2006/0287083 | A1 * | 12/2006 | Ofek et al. ....................... 463/37 |
| 2008/0303922 | A1 * | 12/2008 | Chaudhri et al. ......... 348/231.99 |
| 2010/0060751 | A1 * | 3/2010 | Pinto et al. .................. 348/226.1 |
| 2010/0103289 | A1 | 4/2010 | Goel |
| 2010/0120456 | A1 * | 5/2010 | Karmarkar et al. ........... 455/466 |
| 2010/0321647 | A1 * | 12/2010 | Schuler ................. G06F 1/3203 353/121 |
| 2011/0205392 | A1 * | 8/2011 | Yokoi ......................... 348/224.1 |
| 2012/0053829 | A1 * | 3/2012 | Agarwal ................ G01C 21/20 701/418 |
| 2012/0133790 | A1 * | 5/2012 | Sams ....................... G06T 15/60 348/222.1 |

OTHER PUBLICATIONS

Tominaga, Shoji et al., "Color temperature estimation of scene illumination," in Proc. 7th Color Imaging Conf., Nov. 1999, pp. 42-47.

\* cited by examiner

*Primary Examiner* — Frederick Bailey
(74) *Attorney, Agent, or Firm* — Kilpatrick Townsend & Stockton LLP (57) ABSTRACT

Information about a context of a mobile device is inferred using measurements from light detectors of the mobile device. The light detectors may be located on multiple different sides of the mobile device. In some embodiments, measurements from one or more cameras may be used to infer context.

35 Claims, 4 Drawing Sheets

METHOD AND APPARATUS FOR CHARACTERIZING CONTEXT OF A MOBILE DEVICE

This application claims the benefit of U.S. Provisional Application No. 61/433,865, filed Jan. 18, 2011, entitled "Mobile Device Camera as a Light Detector," which is hereby incorporated by reference in its entirety and is assigned to the assignee of the currently claimed subject matter.

BACKGROUND

1. Field:

Subject matter disclosed herein relates generally to mobile or portable devices and, more particularly, to techniques for enhancing the usability of mobile or portable devices.

2. Information:

Context awareness refers to an ability of a mobile device to collect information about an environment in which the device is operating and react to or change operational characteristics based upon that information. Context awareness capabilities are becoming more and more prevalent in the communications industry. There is a growing need for new and useful techniques and structures for implementing context awareness in communication devices.

SUMMARY

Light detectors on multiple sides of a mobile device are used to collect measurements for use in inferring a context of a mobile device. A first light detector may be provided on a first side of the mobile device and a second light detector may be provided on a second, opposite or adjacent side of the device. A processor is used to process signals from the first and second light detectors to characterize the context of the device. The light detectors may include, for example, ambient light detectors or cameras. The processor may receive one or more first signals from the first light detector responsive to light impinging on the first surface of the mobile device and one or more second signals from the second light detector responsive to light impinging on the second surface of the mobile device. The processor may then use these first and second signals to characterize an environment of the mobile device based, at least in part, on the first and second signals. In some embodiments, signals from three or more light detectors on three or more different sides of a mobile device may be used to characterize a context of the device.

When a camera is used as a light detector of a mobile device, in some embodiments, signals from the camera may be processed for use in characterizing context. For example, in one approach, an average intensity is calculated using pixel data from a camera image for use in characterizing an environment of the mobile device. In another approach, average light intensities are calculated for different colors of a color space from a camera image for use in characterizing an environment of the mobile device. In still another approach, higher order coefficients (e.g., discrete cosine transform coefficients, etc.) may be computed for various image color intensities from a camera image for use in characterizing an environment of the mobile device.

In some implementations, a machine implemented method comprises: receiving one or more first signals from a first light detector responsive to light impinging a first surface of a mobile device; receiving one or more second signals from a second light detector responsive to light impinging on a second surface of the mobile device, the second surface being different from the first surface; and characterizing an environment of the mobile device based, at least in part, on the first and second signals.

In other implementations, a mobile device, comprises: a first light detector on a first side of the mobile device; a second light detector on a second side of the mobile device, the second side being different from the first side; and a processor to process signals from the first and second light detectors to characterize an environment of the mobile device.

In still other implementations, an apparatus comprises: a machine-readable storage medium having stored thereon instructions executable by a computer system to: acquire one or more first signals from a first light detector responsive to light impinging a first surface of a mobile device; acquire one or more second signals from a second light detector responsive to light impinging on a second surface of the mobile device, the second surface being different from the first surface; and characterize an environment of the mobile device based, at least in part, on the first and second signals.

In other implementations, an apparatus comprises: means for receiving one or more first signals from a first light detector responsive to light impinging a first surface of a mobile device; means for receiving one or more second signals from a second light detector responsive to light impinging on a second surface of the mobile device, the second surface being different from the first surface; and means for characterizing an environment of the mobile device based, at least in part, on the first and second signals.

BRIEF DESCRIPTION OF THE FIGURES

Non-limiting and non-exhaustive implementations will be described with reference to the following figures, wherein like reference numerals refer to like parts throughout the various figures unless otherwise specified.

DETAILED DESCRIPTION

Reference throughout this specification to "one implementation," "an implementation," "certain implementations," or "various implementations" means that a particular feature, structure, or characteristic described in connection with a described implementation may be included in at least one implementation of claimed subject matter. Thus, appearances of the phrase "in one example implementation," "in an example implementation," "in certain example implementations," or "in various example implementations" in various places throughout this specification are not necessarily all referring to the same implementation(s). Furthermore, particular features, structures, or characteristics may be combined in one or more implementations.

A smartphone is a mobile device that combines mobile communication capabilities with a high level of computational power. This computational power may allow software applications to be supported that were not possible in more conventional cellular telephones. Smartphones may include, for example, a powerful microprocessor, a graphics processing unit, a high-resolution touch screen, and/or a large amount of memory. In addition, some smartphones may include an ambient light sensor and a camera. In a typical scenario, a light sensor may provide useful information in an easily accessible manner. For example, a reading from a light sensor may be used to gauge the intensity of ambient light around a device to allow, for example, automatic adjustment of screen brightness. Contextual information provided by a single light sensor is, however, limited. One shortcoming is that a light sensor may be present on only one side of a device and, therefore, is only capable of measuring light from one direction. If the device is on a table in a well lit room, for example, the light sensor may register a different reading based on whether the device is face up or face down on the table.

In addition, an output signal of a light sensor may be quantized into a small number of bins. This limited number of bins may significantly limit the usefulness of the light sensor reading in performing context awareness applications. For example, the sensor reading may not provide a level of precision sufficient to differentiate between a dimly lit room and a completely dark room. Similarly, the sensor may not allow a situation where the light sensor is in a pocket facing toward the body to be differentiated from a situation where the light sensor is in a packet facing away from the body. The usefulness of the light sensor may be further limited by the fact that the output reading may be a single dimensional quantity (e.g., intensity only). It may not be possible, for example, to use the signal to determine a type of light impinging on the device (e.g., sunlight, incandescent light, fluorescent light, halogen light, etc.).

In various implementations, a camera on a mobile device may be used to characterize ambient light for use in context awareness applications. A camera on one side of a device may be used in conjunction with, for example, one or more light sensors or other cameras on other sides of the device to collect measurements for analysis or contextual inference. In one approach, for example, a camera may be located on a first side of a device and another camera or a sensor (or other form of light detector) may be located on an opposite side of the device. In another approach, a camera may be located on a first side of a device and another camera or a sensor may be located on an adjacent side of the device. By using at least one camera, the complexity or richness of the measurements collected may be much higher than measurements garnered from a light sensor alone. For example, the granularity of light intensity measurements may be much higher than intensity measurements from a sensor. In addition, aspects related to light wavelength (e.g., color information) may be characterized for use in context awareness applications. Light intensity measurements collected on multiple sides of a device may allow context awareness applications to be performed that were not possible previously. In addition, the use of cameras on multiple sides of a mobile device to collect context information may allow even more complex applications to be realized. In at least one implementation, cameras and/or sensors on at least three sides of a mobile device may be used to collect measurements for use in context awareness applications.

Figure 1:
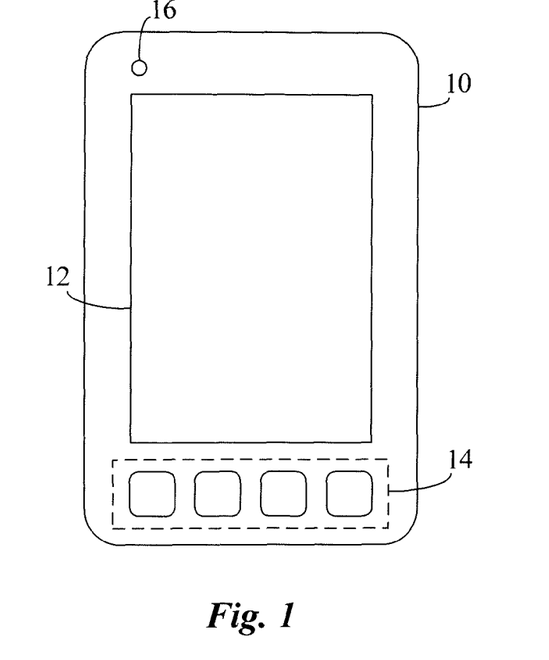
FIGS. 1, 2, and 3 are a front view, a back view, and an edge view of an example mobile device in accordance with an implementation.
Figure 2:
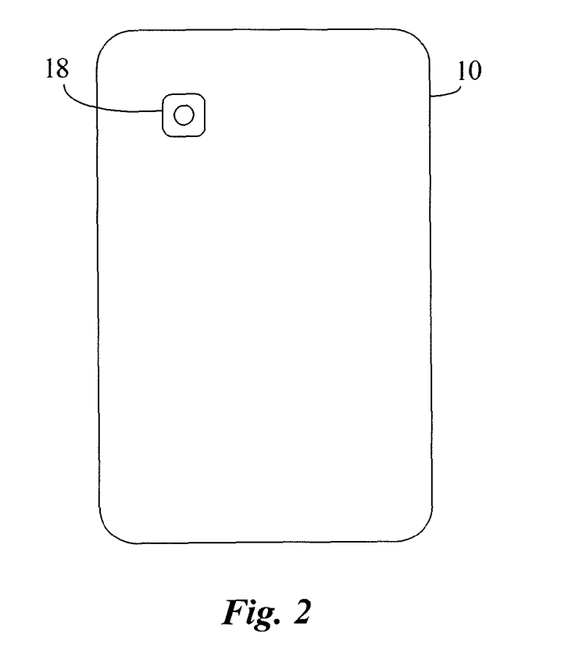
Figure 3:
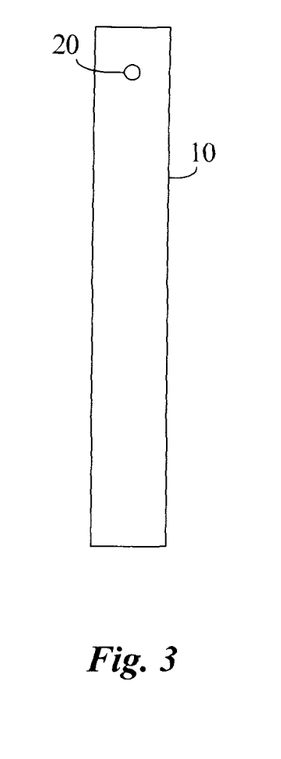

FIGS. 1, 2, and 3 are a front view, a back view, and an edge view of an example mobile device 10 in accordance with an implementation. As shown in FIG. 1, mobile device 10 may include a screen 12 and a number of control keys or buttons 14. Screen 12 may be viewed by a user during, for example, execution of applications. In some implementations, a touch screen may be used that allows a user to input, for example, commands, selections, and/or data by touching relevant portions of the screen. Control buttons 14, when present, may also permit a user to input commands and/or selections. One of control buttons 14 may include, for example, an on/off switch. Mobile device 10 may also include a light sensor 16 to sense light impinging upon a front side thereof.

With reference to FIG. 2, a back side of mobile device 10 may include a camera 18. Camera 18 may be utilized by a user of device 10 to, for example, take still photographs or video images. Camera 18 may include a large number of picture elements (or pixels) that may each capture a small portion of an image. If camera 18 is a color camera, individual pixels may be capable of recording information for various colors or other parameters of a corresponding color space (e.g., RGB). Various different color spaces may be used. As shown in FIG. 3, an edge of mobile device 10 may also include a light sensor 20 in some implementations. In some alternative arrangements, one or both of the light sensors 16, 20 on the front or edge of mobile device 10 may be replaced by, or augmented with, a camera. One or more cameras and/or sensors may also be present on other edges of mobile device 10.

Figure 4:
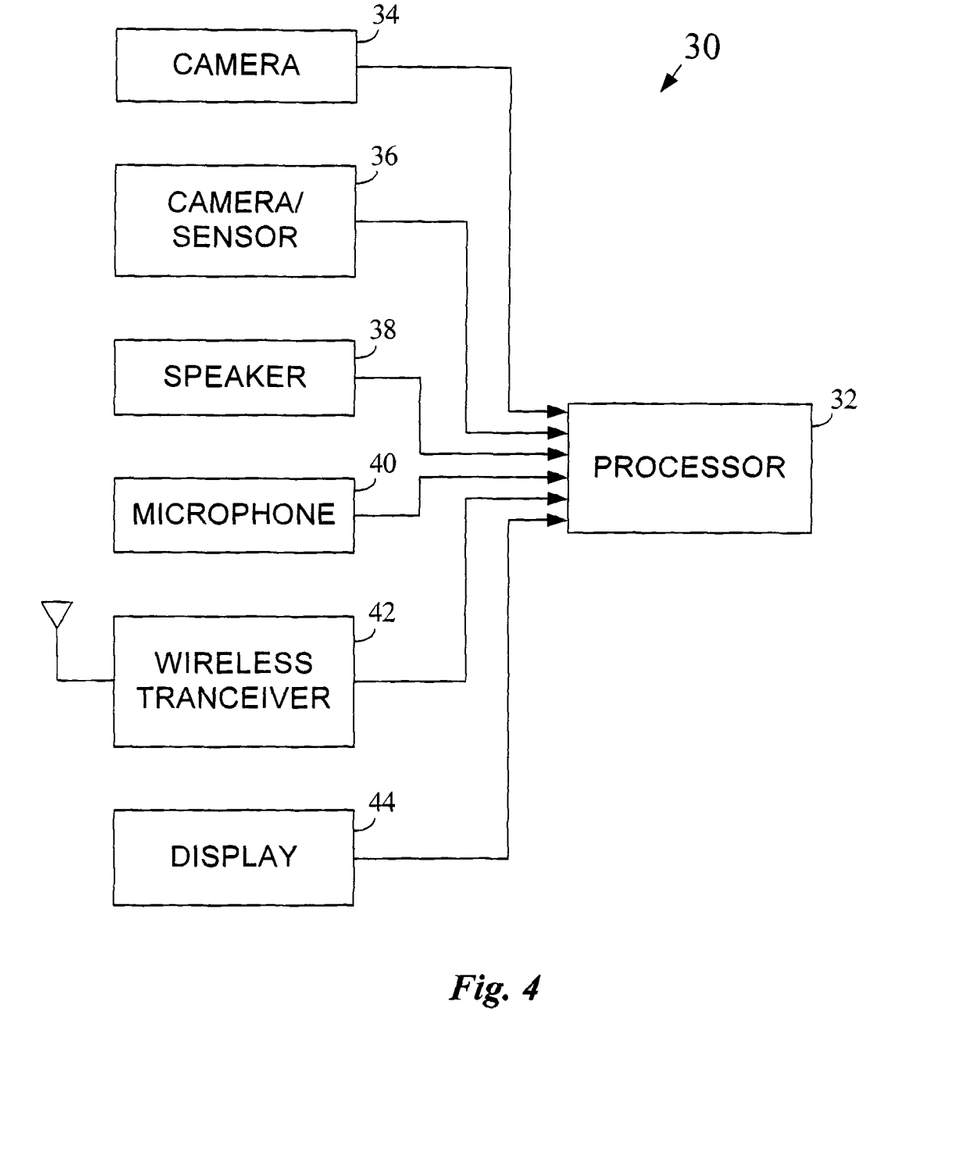
FIG. 4 is a schematic block diagram of aspects of an example mobile device in accordance with an implementation.

FIG. 4 is a block diagram illustrating functionality within an example mobile device 30 in accordance with an implementation. As shown, the mobile device 30 may include: a digital processor 32; a camera 34; a camera or light sensor 36; a speaker 38; a microphone 40; a wireless transceiver 42, and a display 44. As discussed previously, display 44 may be used to display information to a user during, for example, the execution of applications by the processor. In some implementations, display 44 may also include input capabilities (e.g., a touch screen) to allow a user to interact with the device 30. Speaker 38 and microphone 40 may be used during, for example, voice communication activity to allow a user to hear and speak to, respectively, a remote user.

Wireless transceiver 42 may be operative for supporting wireless communication with a remote wireless entity, such as a wireless base station or network access point, to provide communication with a larger network. Wireless transceiver 42 may be configured in accordance with one or more wireless cellular and/or wireless networking standards. In some implementations, multiple wireless transceivers may be present within a mobile device. For example, one or more long range wireless transceivers may be used in conjunction with one or more short range wireless transceivers in some implementations. Some wireless cellular standards that may be supported include, for example, Global System for Mobile Communication (GSM), General Packet Radio Service (GPRS), Universal Mobile Telecommunications System (UMTS), Enhanced Data Rates for GSM Evolution (EDGE), Long Term Evolution (LTE), CDMA2000, High Speed Downlink Packet Access (HSDPA), and/or others, including combinations of standards. Some wireless networking standards that may be supported may include, for example, IEEE 802.11 (WiFi) (e.g., 802.11a, 802.11b, 802.11g, 802.11n, etc.), IEEU 802.16 (WiMax), HomeRF, HiperLAN, Bluetooth, IEEE 802. 15.4 (ZigBee), Ultra-Wideband, and/or others).

Processor 32 may include one or more digital processors that may be used to, among other things, execute applications within the mobile device 30. Any type of digital processor may be used including, for example, a general purpose microprocessor, a digital signal processor (DSP), a microcontroller, an application specific integrated circuit (ASIC), a field programmable gate array (FPGA), a programmable logic device (PLD), a programmable logic array (PLA), a reduced instruction set computer (RISC), and/or others, including combinations of the above. Camera 34 is an image capture device that is capable of capturing still images and/or video images. Camera/sensor 36 may include either a camera, a light sensor, or both a camera and a light sensor. Camera/sensor 36 may be located on a different surface of the mobile device 30 from camera 34. As discussed previously, in various implementations, camera 34 may be used as a light detection device to collect measurements for use in context awareness applications. Camera/sensor 36 may also be used in conjunction with camera 34 to collect context information.

In one example implementation, an average light intensity impinging on a lens of a camera (e.g., camera 34 of FIG. 4) of a mobile device may be computed. If a camera imager is being used that includes pixels that are sensitive to red, green, and blue light, for example, an average light intensity may be computed as follows:

$$\frac{1}{N}\sum_{i=1}^{N}\frac{r(i)+g(i)+b(i)}{3}.$$

where $\{r(1), \ldots r(N)\}$, $\{g(1), \ldots g(N)\}$, and $\{b(1), \ldots b(N)\}$, denote raw red, green, and blue pixel intensities of an image and N denotes a number of pixels. Similar expressions may also be used for camera imagers that utilize other pixel color spaces (e.g., HSV (hue, saturation, value); CMYK (cyan, magenta, yellow, and black); YIQ; and others). Other techniques for calculating an average intensity may alternatively be used. In some implementations, for example, averages over a subset of pixels in an image may be used. In addition, or alternatively, an average of only a subset of available colors may be used (e.g., red and green in an RGB-based imager).

In some RGB-based implementations, average intensities may be computed separately for red, green, and blue to provide a 3-dimensional vector as follows:

$$\left(\frac{1}{N}\sum_{i=1}^{N}r(i), \frac{1}{N}\sum_{i=1}^{N}g(i), \frac{1}{N}\sum_{i=1}^{N}b(i)\right).$$

Vectors that do not use all colors in a color space and/or do not average over all pixels may alternatively be used. In various embodiments, the average intensities may be calculated repeatedly (e.g., periodically, randomly, continually, at predetermined times, in response to predetermined triggers, etc.) during operation of a device. In at least one example implementation, the average intensity of camera images may be calculated K times a second (e.g., K=15 Hz).

In some implementations, higher order coefficients may be computed for various image color intensities. In one approach, for example, discrete cosine transform (DCT) coefficients may be calculated. For a device with an RGB-based camera, for example, DCT coefficients may be used to provide a vector for each color as follows:

$$R=[R(1), \ldots, R(C)]^T,$$

$$G=[G(1), \ldots, G(C)]^T,$$

$$B=[B(1), \ldots, B(C)]^T,$$

where:

$$R(k) = \sum_{i=1}^{N} r(t)\cos\left(\frac{\pi}{N}\left(n+\frac{1}{2}\right)k\right)$$

-continued $$G(k) = \sum_{i=1}^{N} g(t)\cos\left(\frac{\pi}{N}\left(n+\frac{1}{2}\right)k\right)$$

$$B(k) = \sum_{i=1}^{N} b(t)\cos\left(\frac{\pi}{N}\left(n+\frac{1}{2}\right)k\right)$$

N denotes a number of pixels, and C is the number of coefficients computed (e.g., 5, etc.). As above, similar expressions may be used for other color spaces and/or for less than all colors in a space. Also, coefficients may be summed over less than all pixels in some implementations. Other forms of higher order coefficients may alternatively be used.

In at least one implementation, quantities calculated as described above may be stored on a mobile device and any remaining information from captured images may be discarded. In this way, a user's privacy may be preserved in that no photographs, videos, or any information from which photographs or videos could be reconstructed may be stored.

In some implementations, as described above, measurements obtained from a camera imager on one side of a mobile device may be evaluated in combination with information obtained from a light sensor or camera on another side of the device to perform a context awareness application. This may include, for example, an assessment of ambient light intensity on multiple sides of the device to provide a richer evaluation of an immediate environment of a mobile device and an enhanced derivation of user context. For example, in one possible scenario, if a light intensity reading on one side of a device is high and a light intensity reading on an opposite side is low, it may be assumed that a device is resting on a surface. It may also be assumed that the low intensity side is facing downward on the surface. If cameras and/or sensors are located on three different sides of a mobile device (e.g., front, back, and one edge), available measurements may allow for an even richer contextual inference. For example, if readings from front and back sides of a device indicate low light intensity and a reading from an edge indicates high light intensity, it may be assumed that the mobile device is between two surfaces (e.g., resting on a desk with a book on top, within a carrying case with an open end, etc.).

Using a camera on a mobile device as a light detector has other advantages over using an ambient light sensor. For example, a light intensity of a camera imager may be quantized with higher precision than that of an ambient light sensor because the light intensity may be averaged over multiple pixels for a camera imager. Additionally, a light intensity computed from a camera imager may be more accurate than a raw value computed at an ambient light sensor. Another advantage is that the computation of separate color intensities for a camera (e.g., red, green, and blue intensities for an RGB-based camera, etc.) enables a mobile device to identify a type of light impinging upon it (e.g., sunlight, incandescent light, fluorescent light, etc.) from which an even richer contextual inference may be made. For an RGB color space, for example, this can be done by computing a ratio of green intensity to red intensity and a ratio of blue intensity to red intensity and then comparing the computed ratios with ratios expected for different sources of light. A similar approach can be used for other color spaces. DCT coefficients (or equivalent expansion coefficients) of each dimension of a color space may provide additional user context. In some implementations, both average intensity information and DCT coefficient information may be used.

Figure 5:
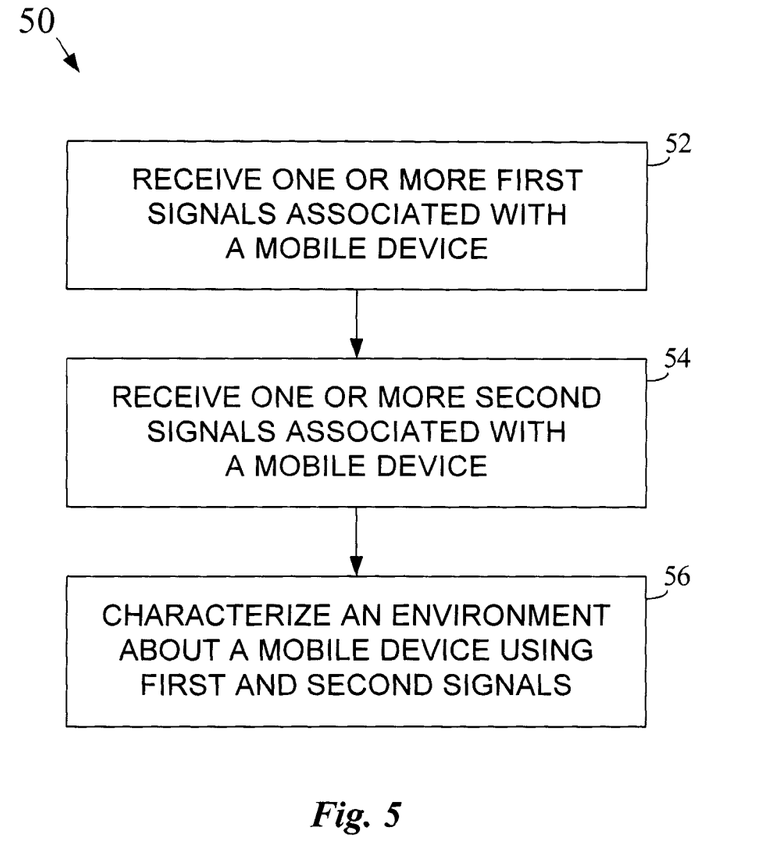
FIG. 5 is a flowchart illustrating a method for use in determining a context of a mobile device in accordance with an implementation.

FIG. 5 is a flowchart illustrating a method 50 for use in determining a context of a mobile device in accordance with an implementation. One or more first signals associated with a mobile device are received (block 52). The first signals may include, for example, signals from a first camera or light sensor of the mobile device. One or more second signals associated with the mobile device are also received (block 54). The second signals may include, for example, signals from a second camera or light sensor of the mobile device. In at least one implementation, the first camera or light sensor may be on a first side of the mobile device and the second camera or light sensor may be on a second, different side of the mobile device. The first and second sides may be either opposite sides or adjacent sides. An environment of the mobile device may then be characterized using the first and second signals (block 56). As used herein, the "environment" of a mobile device is intended to include any situational aspect of the device including, for example, a context of the device.

The characterization of the environment about the mobile device may include, for example, modifying the one or more first signals and/or the one or more second signals. For example, if the first signal(s) were generated by a camera, the modification of the first signals may include: calculating an average intensity for image data (for all or a portion of an image), calculating an average intensity for various colors or other parameters associated with a color space, calculating higher order coefficients for various image color intensities, or calculating one or more other parameters using the image data. In the same manner, if the second signal(s) was (were) generated by a camera, the modification of the second signals may include: calculating an average intensity for image data (for all or a portion of an image), calculating an average intensity for various colors or other parameters associated with a color space, calculating higher order coefficients for various image color intensities, or calculating one or more other parameters using the image data. The first and second signal(s) information may subsequently be compared to characterize the environment about the mobile device. For example, as discussed previously, in one possible scenario, if a light intensity reading on one side of a device is high and a light intensity reading on an opposite side is low, it may be assumed that a device is resting on a surface. Many other strategies for comparing the first and second signal(s) information may also be used in other implementations.

Many applications exist for measurement data collected from a camera in the various manners described above. For example, average intensity information may be used in various implementations to determine device position (e.g., whether the device is in a user's hand, on a table top, in a pant pocket, in a short pocket, in a bag, etc.). Once device position is known, the position information may be used to, for example, estimate device access time (e.g., to determine a number of rings to allow before a call is forwarded to voicemail); estimate latency in user response to test messages and email; efficiently control resource management for applications (e.g., if the device is in a purse/pocket, disable the screen; if the device is in a bag, put the device in sleep mode; etc); improve performance of a motion classifier; adjust ringtone volume; and/or perform other actions. Average intensity information for different colors may be used to determine, among other things, whether a device is indoors or outdoors and, if indoors, the type of room a device is in (e.g., an office having fluorescent ambient light, a home having incandescent ambient light, etc.). Higher order coefficient data may be used in various ways to characterize an environment about a device. For example, if a device is at rest with a camera pointing upward, higher order coefficient data may be used to characterize the texture of a ceiling. This texture information may then be used to infer a type of room that the device is in (e.g., an office, a conference room, a car interior, a room in a home, etc.). Many other applications for measured information also exist.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein can be implemented by various means depending upon the application. For example, these methodologies can be implemented in hardware, firmware, software, or a combination thereof. For hardware implementations, processing may be implemented within, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, methodologies can be implemented with modules (e.g., procedures, functions, and so on) that perform functions described herein. Any machine readable digital medium tangibly embodying instructions can be used in implementing methodologies described herein. For example, software codes can be stored in a storage medium and executed by a processing unit. Storage can be implemented within a processing unit or external to a processing unit. As used herein, the terms "storage medium," "storage media," "storage device," "digital storage," or the like refer to any type of long term, short term, volatile, nonvolatile, or other storage structures and are not to be limited to any particular type of memory or number of memories, or type of media upon which data is stored.

If implemented in firmware and/or software, the functions may be stored as one or more instructions or code on a computer readable medium. Examples include computer readable media encoded with a data structure and computer readable media encoded with a computer program. Computer-readable media may take the form of an article of manufacture. Computer-readable media includes physical computer storage media. A computer readable storage medium may be any available digital medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Techniques described herein may be implemented in conjunction with various wireless communication networks such as, for example, a wireless wide area network (WWAN), a wireless local area network (WLAN), a wireless personal area network (WPAN), and so on. The terms "network" and "system" may be used interchangeably. The terms "position" and "location" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as, for example, cdma2000, Wideband-CDMA (W-CDMA), and so on. Cdma2000 may include IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma 2000 is described in documents from a consortium named "3rd Generation Partnership Project 2" (3GPP2). 3GPP and 3GPP2 documents are publicly available. A WLAN may be, for example, an IEEE 802.11x network or some other type of network. A WPAN may be, for example, a Bluetooth network, an IEEE 802.15x network, or some other type of network. Techniques disclosed herein may also be implemented in conjunction with any combination of WWAN, WLAN, and/or WPAN.

As used herein, the term "mobile device" refers to a device such as a cellular telephone, smart phone, or other wireless communication device; a personal communication system (PCS) device; a personal navigation device (PND); a Personal Information Manager (PIM); a Personal Digital Assistant (PDA); a laptop computer; a tablet computer; a portable media player; or other suitable mobile or portable device which is capable of receiving wireless communication and/or navigation signals. The term "mobile device" is also intended to include devices which communicate with a personal navigation device (PND), such as by short-range wireless, infra-red, wireline connection, or other connection—regardless of whether satellite signal reception, assistance data reception, and/or position-related processing occurs at the device or at the PND. Also, the term "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Designation that something is "optimized," "required," or other similar designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods or structures that would be known by one of ordinary skill have not been described in detail so as not to obscure claimed subject matter.

Some portions of the preceding detailed description have been presented in terms of logic, algorithms, or symbolic representations of operations on binary states stored within a storage medium of a specific apparatus or special purpose computing device or platform. In the context of this particular specification, the term specific apparatus or the like may include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "estimating," "initializing," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

A computer-readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to particular disclosed examples, but that such claimed subject matter may also include all aspects falling within the scope of appended claims, and equivalents thereof.

What is claimed is:

1. A machine implemented method comprising:
receiving an image from a camera disposed to capture light impinging on a first surface of a mobile device;
receiving one or more signals from an ambient light sensor responsive to light impinging on a second surface of said mobile device, the second surface being different from the first surface;
performing an analysis comparing the image from the camera to at least a signal of the one or more signals from the ambient light sensor;
determining a position status of the mobile device with respect to the environment of the mobile device, the determining the position status based, at least in part, on the analysis; and
adjusting a parameter of the mobile device based on the determining of the position status of the mobile device.

2. The method of claim 1, wherein:
the camera comprises a multi-color imaging device.

3. The method of claim 1, wherein:
the characterizing the environment of the mobile device includes calculating an average light intensity using the image.

4. The method of claim 3, wherein:
the calculating the average light intensity using the image includes calculating an average light intensity for only a portion of the image.

5. The method of claim 1, wherein:
the characterizing the environment of the mobile device includes calculating average light intensities for colors of a color space using the image.

6. The method of claim 1, wherein:
the characterizing the environment of said mobile device includes calculating discrete cosine transform (DCT) coefficients for image color intensities of the image.

7. The method of claim 1, further comprising:
discarding said image and the one or more signals after characterizing the environment.

8. The method of claim 1, wherein the parameter of the mobile device is associated with a function of the mobile device unrelated to capturing an image using the camera.

9. The method of claim 1, wherein the position status is chosen from a plurality of statuses, the plurality of statuses comprising:
on table top; and
in hand.

10. A mobile device, comprising:
a camera disposed on a first side of the mobile device;
an ambient light sensor disposed on a second side of the mobile device, the second side being different from the first side; and
a processor configured to:
perform an analysis to compare an image captured by the camera to a signal from the ambient light sensor responsive to light detected by the ambient light sensor;
determine a position status of the mobile device with respect to the environment of the mobile device, the determining the position status based, at least in part, on the analysis; and
adjust a parameter of the mobile device based on the determining the position status of the mobile device.

11. The mobile device of claim 10, wherein:
the first side is an opposite side from the second side.

12. The mobile device of claim 10, wherein:
the first side is adjacent to the second side.

13. The mobile device of claim 10, wherein:
the processor is further configured to calculate an average light intensity using the image captured by the camera.

14. The mobile device of claim 10, wherein:
the processor is further configured to calculate average light intensities for colors of a color space using the image captured by the camera.

15. The mobile device of claim 10, wherein:
the processor is further configured to calculate discrete cosine transform (DCT) coefficients for image color intensities for the image captured by the camera.

16. The mobile device of claim 10, further comprising:
a third light detector disposed on a third side of said mobile device, the third side being different from the first and second sides;
wherein the processor is further configured to process signals from the third light detector to determine the position status.

17. The mobile device of claim 10, wherein:
the processor is further configured to discard the image the camera and the signal from the ambient light sensor after characterizing the said environment of the mobile device.

18. The mobile device of claim 10, wherein the parameter of the mobile device is associated with a function of the mobile device unrelated to capturing an image using the camera.

19. The mobile device of claim 10, wherein the position status is chosen from a plurality of statuses, the plurality of statuses comprising:
on table top; and
in hand.

20. An apparatus comprising: a non-transitory machine-readable storage medium having stored thereon instructions executable by a computer system to:
acquire one or more first signals from a camera responsive to light impinging a first surface of a mobile device;
acquire one or more signals from an ambient light sensor responsive to light impinging on a second surface of said mobile device, said second surface being different from said first surface;
perform an analysis including comparing at least a signal of the one or more first signals from the camera to the at least a signal of the one or more signals from the ambient light sensor;
determine a position status of the mobile device with respect to the environment of the mobile device, the determining the position status based, at least in part, on the analysis.

21. The apparatus of claim 20, wherein:
the characterizing the environment of the mobile device includes calculating an average light intensity using the image first signals.

22. The apparatus of claim 21, wherein:
calculating the average light intensity using the image includes calculating an average light intensity for only a portion of the image.

23. The apparatus of claim 20, wherein:
the characterizing the environment of the mobile device includes calculating average light intensities for colors of a color space using the image.

24. The apparatus of claim 20, wherein:
the characterizing the environment of the mobile device includes calculating discrete cosine transform (DCT) coefficients for image color intensities of the image.

25. The apparatus of claim 20, wherein the parameter of the mobile device is associated with a function of the mobile device unrelated to capturing an image using the camera.

26. The apparatus of claim 20, wherein the position status is chosen from a plurality of statuses, the plurality of statuses comprising:
on table top; and
in hand.

27. An apparatus comprising:
means for receiving an image from a camera disposed to capture light impinging on a first surface of a mobile device;
means for receiving one or more signals from an ambient light sensor responsive to light impinging on a second surface of the mobile device, the second surface being different from the first surface; and
means for performing an analysis comparing the image from the camera to at least a sign of the one or more signals from the ambient light sensor;
means for determining a position status of the mobile device with respect to the environment of the mobile device, the determining the position status based, at least in part, on the analysis; and
means for adjusting a parameter of the mobile device based on the determining the position status of the mobile device.

28. The apparatus of claim 27, wherein:
the camera comprises a multi-color imaging device.

29. The apparatus of claim 27, wherein:
the means for characterizing the environment of the mobile device includes a means for calculating an average light intensity using the image.

30. The apparatus of claim 29, wherein:
the means for calculating an average light intensity using the image includes a means for calculating an average light intensity for only a portion of the image.

31. The apparatus of claim 27, wherein:
the means for characterizing the environment of the mobile device includes a means for calculating average light intensities for colors of a color space using the image.

32. The apparatus of claim 27, wherein:
the means for characterizing the environment of the mobile device includes a means for calculating discrete cosine transform (DCT) coefficients for image color intensities of the image.

33. The apparatus of claim 27, further comprising:
means for discarding the image and the signals after characterizing the environment.

34. The apparatus of claim 27, wherein the parameter of the mobile device is associated with a function of the mobile device unrelated to capturing an image using the camera.

35. The apparatus of claim 27, wherein the position status is chosen from a plurality of statuses, the plurality of statuses comprising:
on table top; and
in hand.

* * * * *